J. W. SMALL.
LIQUID AERATOR.
APPLICATION FILED DEC. 20, 1920.
1,429,652. Patented Sept. 19, 1922.
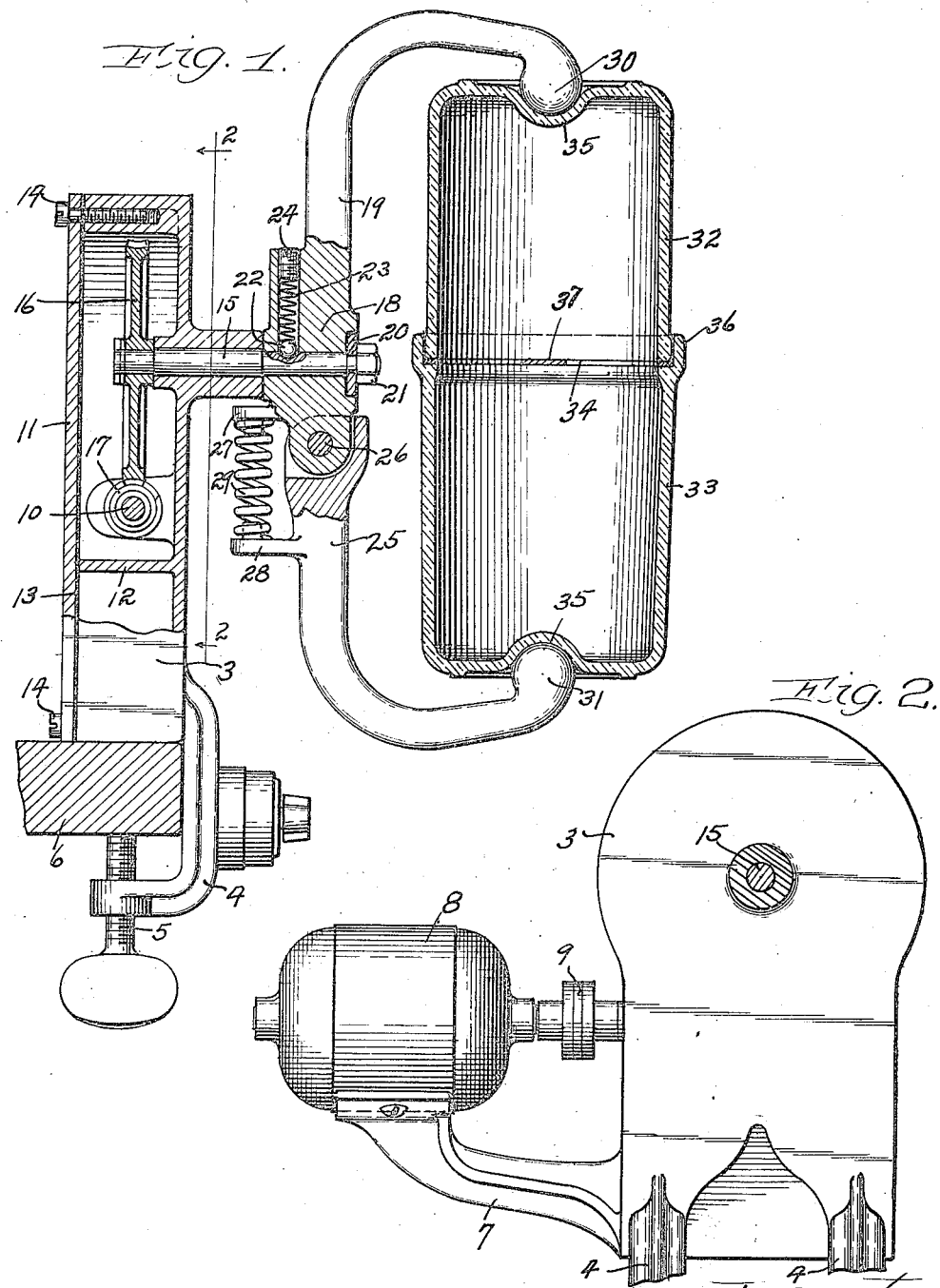

Patented Sept. 19, 1922.

1,429,652

UNITED STATES PATENT OFFICE.

JAMES W. SMALL, OF CHICAGO, ILLINOIS.

LIQUID AERATOR.

Application filed December 20, 1920. Serial No. 432,085.

*To all whom it may concern:*

Be it known that I, JAMES W. SMALL, a citizen of the United States, residing at Chicago, in the county of Cook and State of Illinois, have invented certain new and useful Improvements in Liquid Aerators, of which the following is a specification.

My invention relates to liquid aerators, and has for one of its objects the provision of a simple and efficient aerator for all liquids into which it is desired to force air.

A further object is the provision of a simple and efficient churning device.

Other objects will appear hereinafter.

An embodiment of my invention is shown in the accompanying drawing, forming a part of this specification, and in which—

Fig. 1 is a vertical section taken through the device; and

Fig. 2 is a side view of the housing and motor of my device.

Referring more particularly to the drawing, I have indicated a housing 3 having a clamp 4 attached thereto. The clamp 4 may be formed integrally or in any other desirable manner. A screw 5 is threaded in the bottom of the clamp and adapted to clamp the device onto a table top 6 or other convenient object.

The housing 3 has a bracket 7 formed thereon either integrally or attached in any desirable manner. On the bracket is fixed a motor 8 which may be of any approved construction. The motor has its shaft connected by a coupling 9 to a shaft 10 journaled in the housing 3. I preferably provide a lid 11 on one side of the housing with a partition 12 adjacent the shaft 10 so as to provide an oil reservoir for oiling the various moving parts of the device. A gasket 13 may be provided between the lid 11 and housing 3, and said lid held in place by screws 14, or their equivalent.

Above the shaft 10 and at substantially right angles thereto, I have indicated a shaft 15 which carries a worm gear 16 meshing with a worm 17 on shaft 10. The gearing 16 and 17 provide a means for reducing the speed of shaft 15 to a convenient speed for producing proper agitation of a liquid held in the liquid holders to produce aeration or churning of the liquid.

Journaled on the shaft 15 is the hub 18 of an arm 19. The shaft 15 may be provided with a washer 20 and nut 21 for holding the hub 18 in position. In one side of shaft 15 I have provided a depression in which a ball 22 is adapted to engage. The ball 22 is mounted in a hole in hub 18, substantially as indicated in Fig. 1, with a spring 23 pressing the ball toward the shaft. A screw 24 is threaded in the hole in said hub and may be adjusted to vary the tension on spring 23.

An arm 25 is pivoted as at 26 to the hub 18 of arm 19. An ear 27 is formed on hub 18 and an ear 28 is formed on arm 25 with a compression spring 29 between said ears.

At the ends of arms 19 and 25 are projections 30 and 31 which extend toward each other and substantially equi-distant from the axis of shaft 15. Between the projections 30 and 31 are mounted two facing jars 32 and 33. These jars may be of glass or any other desirable substance. Between the rims of jars 32 and 33 may be provided a gasket 34. The bottoms of said jars have depressions 35 therein engaging the balls 30 and 31. The jar 33 is indicated as having a flange 36 extending over the gasket and onto rim of jar 32. Any suitable connection may be provided between the jars for sealing the joint and holding the jars in alinement.

In use an electric current is turned onto motor 8 which rotates shaft 10 and through the connecting gearing, shaft 15. The pressure of spring 23 is sufficient to hold ball 22 in the depression of shaft 15 to cause rotation of the arms 19 and 25, together with the jars 32 and 33. The speed of shaft 15 is such as to cause the liquid to drop from one jar to the other, thereby churning the liquid and causing air to be forced into it. The spring 23 is sufficiently weak to permit the arms 19 and 25 to be rotated manually easily on shaft 15 when so desired so as to bring the jars with their axes substantially vertical in order to make it convenient for taking the jars from between the balls 30 and 31. In adjusting the jars into and out of position jar 33 is set on ball 31 and arm 25 pressed downwardly against the influence of spring 29 until jar 32 can pass under the ball 30. Then upon releasing the pressure on the jars, spring 29 will force arm 25 to the position indicated with the balls 30 and 31 engaging the jars to hold them in position.

In some instances it is desirable to form the member 34 between the jars 32 and 33 in the form of a disc with parts cut out having one or more cross members or webs 37 in the path of liquids as they fall from one jar to the other through openings 38 in said disc. The members 37 tend to break up the liquid and helps the aeration.

I claim:—

1. A liquid aerator comprising a power driven shaft having a depression in one side; an aerator vessel holder journaled on said shaft; and a spring-pressed member mounted in the holder and engaging the depression.

2. A liquid aerator comprising a power driven shaft; an aerator vessel holder journaled on said shaft; and a yieldable driving means connecting said holder with said shaft.

3. A liquid aerator comprising a casing; a bracket on said casing; a motor on said bracket; a shaft extending from said casing; a reducing gearing connecting said motor and said shaft; an aerator vessel holder journaled on the shaft; and yieldable driving means locking said holder on said shaft.

4. A liquid aerator comprising a shaft; an arm journaled on said shaft; locking means between the shaft and arm; an arm pivotally mounted on the first-mentioned arm; ball-shaped projections on said arms; and a pair of aerator vessels having depressions in their bottoms engaging the ball-shaped members.

5. A liquid aerator comprising a shaft; an arm mounted on and connected to rotate with said shaft; a spring-pressed arm pivoted to the first-mentioned arm; projections on said arms having their adjacent ends spaced substantially equidistant from the axis of said shaft; and aerator vessels between and recesses in their remote ends engaging said projections.

6. A liquid aerator comprising two jars of substantially equal size facing each other; a flange on one jar extending over on and substantially fitting the other jar; a holder clamping the jars together and pivotally mounted on an axis in a plane between the jar rims; and means for rotating said holder.

7. A liquid aerator comprising two glass jars of substantially equal size opening toward each other and having recesses in their bottoms; a gasket between said jars; a flange on one jar extending across said gasket and onto the other jar; a holder made up of two arms engaging said recesses with one arm mounted for rotary movement and the other arm pivoted to the first-mentioned arm; and means for rotating the arms and jars.

8. A liquid aerator comprising a casing; a clamp attached to said casing; a motor bracket attached to said casing; a motor on said bracket a shaft journaled in said casing and extending therefrom; a pair of reducing gears connecting the motor and said shaft; an arm journaled on said shaft; a spring-pressed member mounted in said arm and engaging said shaft, adapted to yieldably lock said arm to said shaft; a spring-pressed arm pivoted to the first-mentioned arm; projections on said arms extending toward each other; two jars opening toward each other and having depressions in their bottoms engaging said projections; and a gasket between said jars.

9. A liquid aerator comprising two jars opening toward each other; a gasket disposed between the jars and having portions extending across between the jars in the path of liquid passing from one jar to the other in use; a clamp engaging and clamping the jars toward each other and against said gasket; and means for rotating said clamp.

In testimony whereof I have signed my name to this specification on this 16th day of December, A. D. 1920.

JAMES W. SMALL.